US011159418B2

(12) United States Patent
Neshat

(10) Patent No.: US 11,159,418 B2
(45) Date of Patent: Oct. 26, 2021

(54) METHOD AND AN APPARATUS FOR ROUTING DATA PACKETS IN A NETWORK TOPOLOGY

(71) Applicant: Telia Company AB, Solna (SE)

(72) Inventor: Reza Neshat, Solna (SE)

(73) Assignee: Telia Company AB, Solna (SE)

( * ) Notice: Subject to any disclaimer, the term of this patent is extended or adjusted under 35 U.S.C. 154(b) by 0 days.

(21) Appl. No.: 16/654,089

(22) Filed: Oct. 16, 2019

(65) Prior Publication Data
US 2020/0136956 A1  Apr. 30, 2020

(30) Foreign Application Priority Data
Oct. 29, 2018  (SE) .................... 1851342-4

(51) Int. Cl.
*H04L 12/715* (2013.01)
*H04L 12/707* (2013.01)
*H04L 12/703* (2013.01)

(52) U.S. Cl.
CPC .............. *H04L 45/04* (2013.01); *H04L 45/24* (2013.01); *H04L 45/28* (2013.01)

(58) Field of Classification Search
CPC ......... H04L 45/28; H04L 45/22; H04L 45/24; H04L 45/02; H04L 45/586; H04L 45/745;
(Continued)

(56) References Cited

U.S. PATENT DOCUMENTS 6,192,051 B1 * 2/2001 Lipman ................. H04L 45/742
370/389
7,970,938 B1 * 6/2011 Lambeth ............ H04L 12/4641
709/245
(Continued)

FOREIGN PATENT DOCUMENTS

EP  2071780 A1  6/2009

OTHER PUBLICATIONS

J. Behrens and J. J. Garcia-Luna-Aceves, "Hierarchical routing using link vectors," Proceedings. IEEE INFOCOM '98, the Conference on Computer Communications. Gateway to the 21st Century (Cat. No. 98, 1998, pp. 702-710 vol. 2, doi: 10.1109/INFCOM. 1998.665092. (Year: 1998).*

(Continued)

Primary Examiner — Douglas B Blair
Assistant Examiner — Rachel J Hackenberg
(74) Attorney, Agent, or Firm — Burr & Forman LLP; Jeffrey H. Kamenetsky

(57) ABSTRACT

The embodiments relate to a method and a routing device. The method comprises introducing a logical hierarchy by defining a plurality of transit layers wherein to each transit layer a transit layer address is assigned and a transit router and wherein each transit router has a unique network address; the layers are organized in a descending order of subnet masks; for each interface between a router and said transit routers, defining, in a routing table of said router, a static route based on the transit layer address and the subnet mask of the transit router interfacing with the router; and if a connection that carries traffic between the router and any of the transit routers fails, selecting a static route in said routing table as a redundant route for carrying said traffic towards its destination.

10 Claims, 5 Drawing Sheets

(58) Field of Classification Search
CPC ....... H04L 45/48; H04L 45/52; H04L 45/122; H04L 45/42; H04L 45/72; H04L 45/302; H04L 45/58; H04L 45/56; H04L 45/583; H04L 45/64; H04L 45/748; H04L 41/0654; H04L 41/12; H04L 41/085; H04L 41/024; H04L 41/00; H04L 41/0886; H04L 41/0663; H04L 69/40; H04L 69/14; H04L 69/324; H04L 69/325; H04L 9/0836

See application file for complete search history.

(56) References Cited

U.S. PATENT DOCUMENTS

| | | | |
|---|---|---|---|
| 9,419,842 B1* | 8/2016 | Galliher, III | H04L 49/1515 |
| 10,015,073 B2* | 7/2018 | Patel | H04L 45/48 |
| 2005/0237925 A1 | 10/2005 | Taylor et al. | |
| 2006/0092950 A1* | 5/2006 | Arregoces | H04L 63/0254 370/396 |
| 2008/0049621 A1* | 2/2008 | McGuire | H04L 12/4645 370/236.2 |
| 2008/0159127 A1* | 7/2008 | Ozaki | H04L 45/22 370/225 |
| 2009/0154340 A1* | 6/2009 | Kumaresan | H04L 45/586 370/218 |
| 2011/0149963 A1* | 6/2011 | Hamilton | H04L 47/125 370/392 |
| 2011/0149965 A1* | 6/2011 | Judge | H04L 45/04 370/392 |
| 2015/0257081 A1* | 9/2015 | Ramanujan | H04L 45/125 370/329 |

OTHER PUBLICATIONS

Search Report, Application No. 1851342-4, dated Oct. 29, 2018, Swedish Patent and Registration Office, Stockholm, Sweden.

* cited by examiner

METHOD AND AN APPARATUS FOR ROUTING DATA PACKETS IN A NETWORK TOPOLOGY

TECHNICAL FIELD

The present disclosure relates to the field of data communications, and in particular to a method and an apparatus in the form of a router for routing data packets in case a link failure occurs in the network topology.

BACKGROUND

Routing is a very basic and fundamental process when it comes to computer and data networks and is handled by router devices, also known as routers. Routers refer to use of their routing tables in order to make a decision for forwarding (data) packets that they receive out to one of their interfaces in such a way that the packets get one hop closer to the destination router or the destination network. Routing tables may be either static or dynamic.

Static routing tables need to be configured by administrators while dynamic routing tables are automatically generated by the fact that the involved routers use dynamic routing protocols in order to communicate to each other and understand the situation of the network topology, available links and possible failures and make a decision about the best path for different network destinations. Although there are major benefits by employing dynamic routings like automatic route recovery in case of failure and automatic best route selection and so on, there are also some major drawbacks or constraints when it comes to using dynamic routings.

The main constraints or disadvantages of introducing dynamic routing into a network may be summarized as follows:

1-) CPU overload (for processing dynamic routing protocols and updates).
2-) Link utilization overload (because of constantly sending dynamic routing updates or hello packets to neighboring routers).
3-) Service disruptions in case of a link failure (due to the time that the dynamic protocol needs for detecting and recovering the failed link/path, also known as "convergence time").
4-) Configuration complexity and requirement of higher skilled administration for configuring and fine tuning the dynamic routing protocol and its parameters.

There is therefore a need for a new method, system and apparatus in the form of a router or routing device for routing packets in a network topology that at least requires less consumption of (CPU) resources, achieve fast routing of packets through fast decision making at each router in case of a link failure; reduces link utilization load and also eliminates the need for convergence time used in dynamic routing.

SUMMARY

It is an object of embodiments herein to solve the above problems by providing a method, a system and an apparatus (router device) for routing packets in a network topology.

According to an aspect of embodiments herein, there is provided a routing method in a network topology, the method comprising: introducing in the network topology a logical hierarchy by defining a plurality of transit layers, for example 2, 3 layers, wherein to each transit layer a transit layer address is assigned and a transit router is assigned; and wherein each transit router has a unique network address. The transit layers are organized in a descending order of subnet masks so that the transit layer address assigned to the highest transit layer in said descending order is a subnet of each transit layer address assigned to lower transit layers in said descending order. For each interface between a router and said transit routers, defining, in a routing table of said router, a static route based on the transit layer address and the subnet mask of the transit router interfacing with the router; and if a connection that carries traffic between the router and any of the transit routers fails, selecting a static route in said routing table as redundant route for carrying said traffic towards its destination.

According to another aspect of embodiments herein there is provided a router or routing device in a network topology wherein a logical hierarchy is introduced by defining a plurality of transit layers wherein to each transit layer a transit layer address is assigned and a transit router is assigned; and wherein each transit router has a unique network address. The transit layers being organized in a descending order of subnet masks so that the transit layer address assigned to the highest transit layer in said descending order is a subnet of each transit layer address assigned to lower transit layers in said descending order. The router comprising a processor and a memory, said memory containing instructions executable by said processor whereby said routing device is operative to: for each interface between the routing device and said transit routers, define, in a routing table of said router, a static route based on the transit layer address and the subnet mask of the transit router interfacing with the routing device; and if a connection that carries traffic between the routing device and any of the transit routers fails, select a static route in said routing table as redundant route for carrying said traffic towards its destination.

An advantage with the embodiments herein is that at least less consumption of (CPU) resources is required.

Another advantage is that a convergence time is not required and immediate and automatic route changes in case of a link/interface/router failure (route redundancy and failover) is achieved. The routes are already in the routing table and become active as soon as a link failure takes place. There is no need to wait for updates from neighboring routers (or routing devices) or so. There is no need for extra CPU processes for calculations based on huge number of routing tables nor any need for transmitting lots of updates into the network either.

Another advantage is that the method according to the embodiments herein is applicable on any device or equipment with very basic functionality such as in IoT (Internet of Things) or M2M (Machine to Machine) devices, etc. In other words, the method does not require complex systems or apparatus for it to be implemented and used. Any device which has the very basic routing functionality can be implemented or employed in a system according to some embodiments herein.

Another advantage is that security is increased. This is because no route information including network addresses is sent out to the neighboring routers (in contrast to dynamic routing) and therefore the risk of an attacker/eavesdropper trying to access a link to sniff or intercept traffic and find out the network topology related data or the addresses of other routers and interfaces in the network is avoided.

Additional advantages achieved by the solution herein will become apparent from the following detailed description when considered in conjunction with the accompanying drawings.

BRIEF DESCRIPTION OF THE DRAWINGS

Examples of embodiments herein are described in more detail with reference to the attached drawings in which.

DETAILED DESCRIPTION

Figure 1:
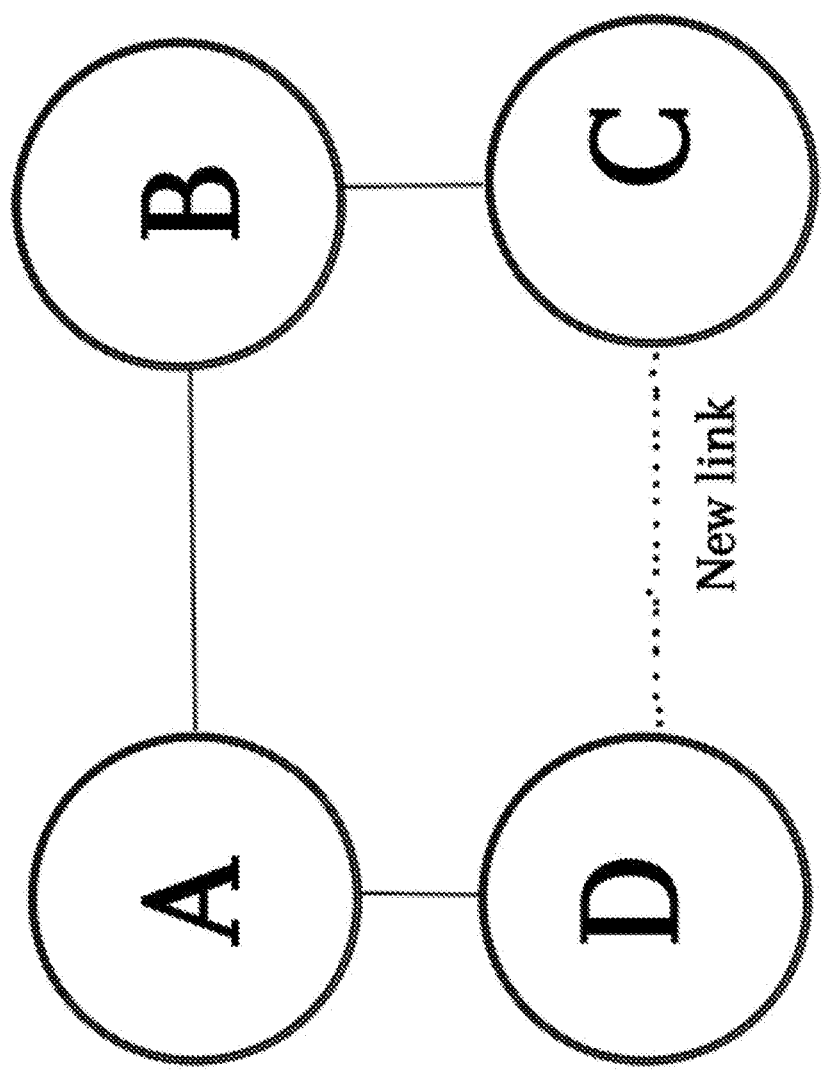
FIG. 1 is an example of a simplified network topology including four networks.

In the following, a detailed description of the exemplary embodiments is presented in conjunction with the drawings to enable easier understanding of the solutions(s) described herein. Hereafter, the routing method according to the embodiments herein is referred to as "Dystatic" routing as it is a mechanism for implementing static routing in a certain way by which the major benefits of dynamic routing protocols, namely, route redundancy and automatic route failover in case of a link, interface or even router failure is achieved without any need for using dynamic routing protocols in the routers.

Dystatic routing achieves this goal by 1-) introducing a logical and abstract hierarchy in IP addressing plan, 2-) employing CIDR (Classless Interdomain Routing) and VLSM (Variable Length SubnetMasking) principles, 3-) taking advantage of longest prefix match route lookup in routing tables and last but not least 4-) a general behavior of all IP routers, namely, route removal by failure of any directly-connected network/interface.

By employing all these four principles, Dystatic routing may provide fully automatic and immediate route correction in case of a link failure leading to nearly zero connectivity disruption or link down time in the network topology.

By implementing static routing in a certain way in which a logical hierarchy in IP addressing scheme is followed, fault tolerance in link or connection level, which in normal cases, can only be achieved by implementing dynamic routing protocols, is met. Dystatic routing can be used in networks with similar topology to hub-and-spoke, semi-mesh, hybrid or full meshed topologies where the administrator has enough control over designing the IP address scheme (e.g., where private range IP addresses, RFC 1918, are used). Request for Comment 1918 or RFC 1918 discloses "Address Allocation for Private Internets", and is the Internet Engineering Task Force (IETF) memorandum on methods of assigning of private IP addresses on TCP/IP networks.

Whenever applicable and used, Dystatic routing may be run in any routing device (or any device having the simplest routing functionality) even if none of the routers support any sort of dynamic routing protocol due to functionality limitation, CPU/memory deficiency or bandwidth overload or link congestion.

Further, Dystatic routing may be implemented in a variety of network topologies such as hybrid, mesh, semi-mesh and hub and spoke topologies. Simply put, it may be applied on any network topology where a logical hierarchy of different network zones or layers may be defined.

Dystatic routing is based on at least four functionalities as described earlier which include: 1-) introducing a logical and abstract hierarchy in IP addressing plan, 2-) employing CIDR/VLSM principles, 3-) taking advantage of longest prefix match route lookup in routing tables and last but not least 4-) a general behavior of all IP routers, namely, route removal by failure of any directly-connected network/interface. By employing all these four principles, Dystatic routing can provide fully automatic and immediate route correction in case of a link failure leading to nearly zero disruption or link down time in the network.

After a brief explanation about each item, the method of Dystatic routing is described.

1-) Hierarchy

Dystatic routing requires a certain hierarchy to be introduced into the network topology in order for it to function.

There are two main layer types defined by Dystatic routing, 1) the transit layer(s) and 2) the network layer(s). These layers are logical/abstract layers and will not necessarily affect the current situation and topology of an existing network. The administrator/designer may simply consider some routers to be in a transit layer while others reside in network layers. The transit layer, which may be more than one layer, contains the routers or routing devices that are (or could be) responsible for handling the traffic of networks other than their own traffic (other than traffic of their own connected networks, by another word, the routes that they had before Dystatic routing comes into play). The more transit layers are introduced to the network, the more reliability/redundancy is achieved at the expense of an increased complexity. Each transit layer has a transit address and transit mask other than the normal network address(es) that the networks in it have. It should be noted that these newly introduced concepts like transit layer, transit address and so on are just abstract concepts which help to understand and plan the network addressing, otherwise, there is usually no need to make any change in the placement of routers in a currently functioning network. Also note that whenever the term "transit address" is used in this text, this address is a type of network IP address, and not a host IP address.

2-) CIDR/VLSM

Since decades ago, CIDR (Classless Interdomain Routing) and VLSM (Variable Length SubnetMasking) have introduced flexibility and control by enabling administrators to divide and segment their networks and network addresses into subnets of various sizes. Moreover, they helped aggregate and group different network addresses into a single but bigger network address in order to make the routing and network categorization much simpler and more efficient. Dystatic routing takes advantage of these concepts when it comes to planning of IP addressing in the whole network and employs VLSM in order to introduce more than one route for the same network(s). It also implicitly uses CIDR concept for route aggregation and addressing. More details are provided below.

3-) Route Prefix

A router needs to decide about a route if there is more than one route towards a particular destination address in its routing table (provided that all routes have the same administrative distance). Administrative distance is a well-known concept in routing which is a way of prioritizing or giving weight to trustworthiness or significance of different routes towards a network, learnt from different dynamic protocols. The one which is more specific (has the longest prefix) will be considered as the valid/applicable one to make the routing decision based on. For example, for a packet destined to 10.11.12.13 reaching a router which contains two routes, 10.11.0.0/16 to interface serial 0 and 10.11.12.0/24 to interface serial 1, the router or routing device will send the packet out through the interface serial 1 because the more specific route is pointing to this interface, although both routes include the destination address.

4-) Route Removal of Failed/Disconnected Interfaces

Considering the example above, if interface serial 1 goes down or gets shutdown for any reason (either if it gets administratively down or because of a link failure) the corresponding route to it (i.e., 10.11.12.0/24) will automatically and immediately be removed from the routing table by the router. This is a universal behavior of all routers, as all routes corresponding to an interface which is in DOWN state are no longer valid. When this route is removed from the routing table, the only valid route, which is remaining in the routing table, is 10.11.0.0/16 which includes our exemplary packet's destination address, 10.11.12.13. In other words, if interface serial 1 goes down, the router will route this packet to the serial 0 instead of serial 1 until the serial 1 is up again and the corresponding route to it is back (gets active again) in the routing table. This feature is used by Dystatic routing to function and does not need any special configuration or any dynamic routing process to be in place in order to function.

In order to simplify the way that Dystatic routing works and the way it should be implemented, the concept will be described by a simple example which gradually develops during this text.

Referring to FIG. 1, consider four exemplary networks, A, B, C and D which need to communicate to each other. It should be noted that the embodiments of the present disclosure are in no-way restricted to any particular number of networks in a topology. The example of FIG. 1 and corresponding text is provided to easily understand the disclosure in. The current topology of FIG. 1 is a simple and flat one with no redundancy. For example, if network D wants to send a packet to (communicate with) network C, it needs to send the packet towards A where the packet gets routed towards B and finally it is delivered to the network C. Redundancy can be added to this network by, for example, adding a link between D and C so that the communication between these two networks can be achieved directly. However, this redundancy cannot be considered a real redundancy or fault tolerance if no dynamic routing is employed, because the administrator should specify the way this communication takes place in the routing table, either 1—via the direct link or 2—via the A and B network. In other words, even if an extra link exist between two nodes or networks, fault tolerance is not necessarily achieved if dynamic routing is not employed, because just by having static routing, the routes cannot get automatically changed whenever a primary link fails. However, Dystatic routing solves this problem in an elegant and efficient way, even without employing dynamic routing protocols.

Figure 2:
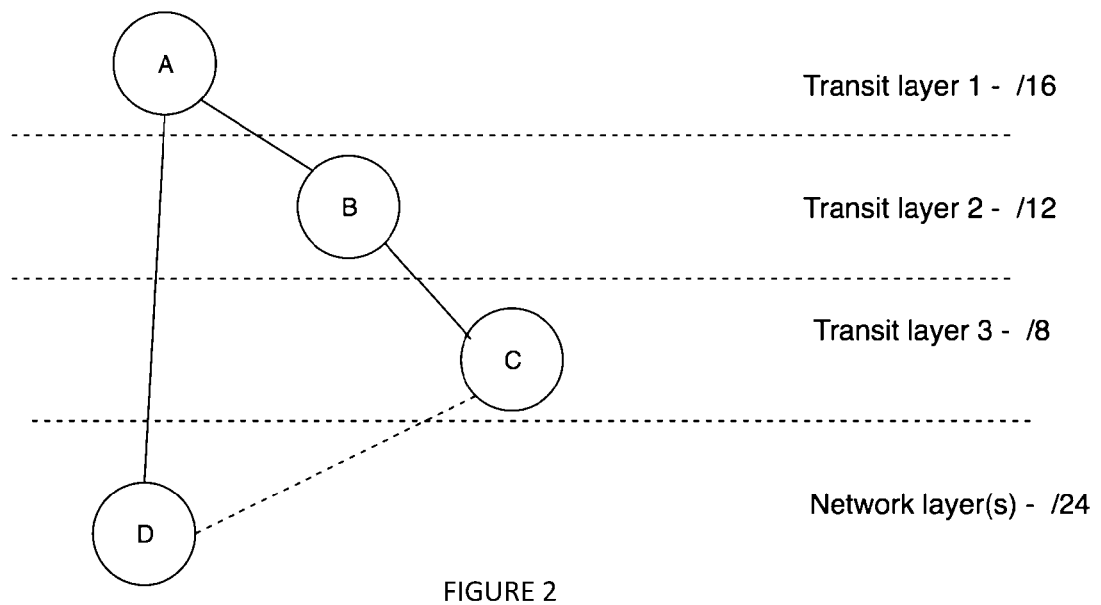
FIG. 2 is an example of a simplified network topology wherein embodiments of the present disclosure may be employed.

In order to apply Dystatic routing into this network topology, we need to introduce a new logical hierarchy. For example, this may be achieved as it is shown in FIG. 2. Note that FIG. 2 represents exactly the same network as in FIG. 1 but is illustrated in another way in order to introduce an abstract hierarchy. In this new way of depicting the topology, network A is put in transit layer 1, network B is put in transit layer 2 and network C is put in transit layer 3. Network D, however, does not belong to any transit layer, i.e., it is an ordinary network layer. Each transit layer needs to have a fixed and determined transit layer address and subnet mask. This address (and subnet mask) has nothing to do with the actual network addresses, subnetting or supernetting or subnet masks in any of the networks. It is just a representation of a layer or precedence of hierarchical levels. The higher the transit layer, the longer the subnet mask should be chosen. Moreover, the longest transit layer subnet mask should be shorter than any subnet mask used in any of the networks. The only relationship between the network addresses and the transit addresses is that the all network addresses should belong to (be a subnet of) the transit address of the highest transit layer which is the transit address with the longest subnet mask. In another word, all network addresses should belong to (be a subnet of) the smallest transit address. The addressing scheme needs to follow the principles of VLSM and CIDR in order for the routing in general (and Dystatic routing specifically) to function as it should. It is actually the principles of VLSM and CIDR that makes us able to construct logical network address spaces which can be considered as subsets of other networks. For example 10.0.0.0/16 can be considered as a subset (and also subnet) of 10.0.0.0/12 which in turn is a subset (or subnet) of 10.0.0.0/8.

So we can use the following transit layer subnet masks for our example:

Address and subnet mask of transit layer 1: 10.0.0.0/16, network address of A: 10.0.1.0/24

Address and subnet mask of transit layer 2: 10.0.0.0/12, network address of B: 10.0.2.0/24

Address and subnet mask of transit layer 3: 10.0.0.0/8, network address of C: 10.0.3.0/24

Hence, the Dystatic routing method according to the embodiments includes: introducing in the network topology a logical hierarchy by defining a plurality of transit layers wherein to each transit layer a transit layer address is assigned and a transit router is assigned; and wherein each transit router has a unique network address. The transit layers are organized in a descending order of subnet masks so that the transit layer address assigned to the highest transit layer in said descending order is a subnet of each transit layer address assigned to lower transit layers in said descending order. For each interface between a router and transit routers, defining, in a routing table of said router, a static route based on the transit layer address and the subnet mask of the transit router interfacing with the router; and if a connection that carries traffic between the router and any of the transit routers fails, selecting a static route in said routing table as redundant route for carrying said traffic towards its destination.

In order to implement Dystatic routing in the network topology, the designer just needs to follow these rules:

1—Each transit layer has or is assigned a transit layer address and subnet mask. A transit router is also assigned to the transit layer and each transit router has a unique network address. For example, C is a transit router for a path between B and D and vice versa. It should be noted that a transit layer 3 is not only for traffic between D and B, although in this very particular example it seems so (because of the connection layout between routers. In general, a transit layer router can contribute to handling traffic other than its own main traffic.

2—Each transit address is a subnet of its lower transit address

3—Transit layer addresses are not used/set on any interface in reality and are just for the sake of introducing hierarchy and route precedence. Only the corresponding routes towards them are defined in other routers.

4—Any network address used in the whole network should be a subnet of the highest transit layer address 5—Every router connected to any interface in a transit layer should have the route for the transit layer address in addition to other network related routes.

6—There could be one or more transit layer(s), for example three layers as previously exemplified. More transit layers introduce more redundancy and at the same time more complexity to the network connectivity.

The above-mentioned rules can also be formulated as a set of instructions (like an algorithm) for introducing Dystatic routing to a new or an existing network. The following action-based and instruction-like steps are another way of formulating the above-mentioned rules:

Define the desired number of the transit layers based on the level of required redundancy and transit routers, usually even one transit layer gives enough redundancy Choose a network address with the longest possible subnet mask which includes all the IP addresses used in your network and assign it to the highest transit layer For example, if there are many 192.168.x.x/24 network addresses used in your network, you can choose 192.168.0.0/16 as your highest transit layer which includes all your network addresses currently being used in the network.

Choose another network address with a shorter subnet mask which includes all the IP addresses used in your network and also includes the transit address of the layers above For example, considering the above example, one may choose 192.0.0.0/8 for the next transit layer. Note that the jumping from/16 to/8 in the examples in this text is only for the sake of simplicity. In practice it could be as granular as/15 for a lower transit layer address for/16 and so on.

Repeat this process until all transit addresses are defined.

Define a static route on any routing device which has any interface connected to a transit router (in addition to the normal routes for the normal network addresses). Use the transit address and subnet mask for creating the static route.

For example, if router X is connected to two transit routers through its interfaces Xa and Xb, one should define two new static routes that define the route towards the corresponding transit layer addresses should be through Xa and Xb accordingly. These routes are in addition to the currently available routes for existing normal network IP addresses in the network.

The way that Dystatic routing functions is that by introducing a set of new routes (adding transit layer addresses) into the network in a hierarchical manner it causes the traffic to be handed over to one of the transit layer routers to be handled from there in case of any link failure, i.e., lack of direct route. The transit layer routers will send the packet further to the destination (in case of having a direct link/route) or send it further to the next transit layer router from which the destination network may be reached. The higher transit layers (with shorter subnet masks) have priority in handling the traffic which is forwarded due to link failures (thanks to the most specific route selection mechanism), so the designer (for example) may assign the more powerful routers to higher transit layers.

For example, whenever C and D want to communicate with each other they communicate through their direct link since there is a/24 route defined in them for the other network (network layer address). However, if the link between C and D fails, or one of the interfaces goes down, (consequently the/24 route will be automatically removed on both ends), then the active route for reaching the other network is either the 10.0.0.0/16 route towards A for router D or the 10.0.0.0/12 route towards B for router C which eventually lead the traffic toward the destination.

As an example, routing table of router/routing device D may be reviewed here. When the direct link between C and D exists the routing table on router D will look like this:

10.0.4.0/24 directly connected. (self-network)
10.0.3.0/24 serial link towards C (network address route)
**active route for packets destined to network C***
10.0.1.0/24 serial link towards A (network address route) which existed even before introducing Dystatic routing.
10.0.0.0/16 serial link towards A (transit layer address route, because the router is connected to a transit layer router through this serial interface)

Routing table of router D when the direct link between C and D has failed looks like this:

10.0.4.0/24 directly connected. (self-network)
10.0.0.0/16 serial link towards A (transit layer address route, because the router is connected to a transit layer router through this serial interface), ***active route for packets destined to network C**
10.0.1.0/24 serial link towards A (network address route) which existed even before introducing Dystatic routing.

When the direct link between C and D fails, the corresponding route will be automatically removed from both routers C and D. When this happens, the router D will send the packets destined to network C toward router A, because the/16 route towards router A includes the network address of C. The same is true for the return traffic back from C to D. From a perspective of router C, the traffic towards network D will be routed to router B (the/12 transit address) whenever the direct link between C and D fails. Router B will then route the traffic towards router A and then the router A has a/24 route towards network D which means that the packet will finally reach to the destination.

Hence, if the connection that carries traffic between a routing device and any of the transit routers fails, and the transit router is that of a subnet having a lower transit layer address, the static route corresponding to that of the transit router of the highest transit layer as redundant route for carrying said traffic is selected.

The transit router associated with the highest transit layer has the highest subnet mask in said descending order, and the transit router associated with the lowest transit layer in said descending order has the lowest subnet mask in said descending order.

Further, for each interface between the router/routing device and any of the transit routers, the routing table of the router/routing device further includes the transit layer address and the network address of the transit layer associated with the transit router interfacing with said router/routing device and if said connection that carries traffic between the router and any of the transit routers fails, removing, from the routing table of the router or routing device the network address and the static route associated with the failed connection.

Granular redundancy is achieved using the Dystatic routing method. As an example, whenever Dystatic routing is implemented in any network, more links may simply be added in order to increase redundancy and fault-tolerance in link connectivity without any need for restructuring the design or addressing. The only thing that the administrator/designer needs to do is to follow the above-mentioned rules, i.e., adding the routes destined to the transit addresses in addition to other network address routes and the network will continue to work as it should. In other words, in the same way that higher fault tolerance may simply be achieved by adding new links (i.e., introducing more redundancy) in all dynamic routing protocols, the same principle is valid here with Dystatic routing too.

Figure 3:
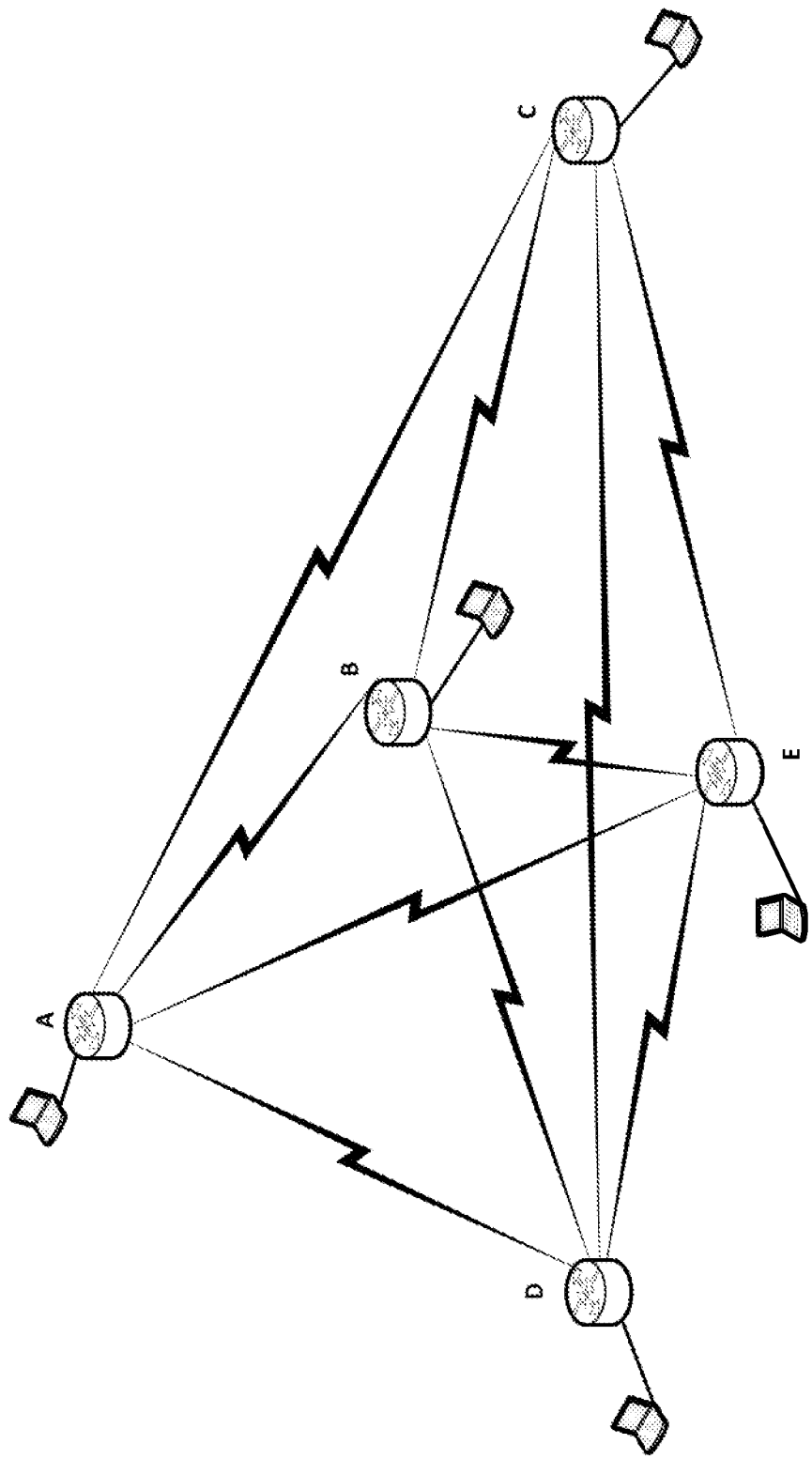
FIG. 3 is another example of a network/system topology depicting a mesh network wherein embodiments of the present disclosure may be employed.

FIG. 3 is a representation of the same above-mentioned network as in FIG. 2, but in a full-mesh scenario where all routers or routing devices are connected to each other in order to increase fault-tolerance via link redundancy. Another network called network E is also added to the network topology, just to show an even more complex example. Even in such a complex mesh scenario the Dystatic routing method functions well if the Dystatic routing rules are properly applied. Making full mesh connections between networks is not common in the majority of cases, however, for the sake of introducing highest complexity to the example, a full mesh scenario is depicted in FIG. 3. Obviously removing any of the transit layers or redundant links will only affect the level of redundancy and not network functionality.

In order to better understand the scenario in FIG. 3, the routing table of the same exemplary router/routing device, i.e., router D, is again shown and compared in two different network states in the full mesh scenario in FIG. 3, first, when all the links and routers are functioning and second, when the direct link towards router C fails.

Routing table of router D when all links are functioning:
10.0.4.0/24 directly connected. (self-network)
10.0.1.0/24 Serial link towards A
10.0.2.0/24 Serial link towards B
10.0.3.0/24 Serial link towards C===>Active route for traffic destined to 10.0.3.0/24
10.0.5.0/24 Serial link towards E
10.0.0.0/16 Serial link towards A (Dystatic route, transit address)
10.0.0.0/12 Serial link towards B (Dystatic route, transit address)
10.0.0.0/8 Serial link towards C (Dystatic route, transit address)

Assuming that the link between C and D fails, the route line number 3 and 8 will immediately be removed from the routing table in router D. After that, any packet destined to network C will be routed to network A (active route or most specific route will be 10.0.0.0/16).

Routing table of router D when the links between C and D fails:
10.0.4.0/24 directly connected. (self-network)
10.0.1.0/24 Serial link towards A
10.0.2.0/24 Serial link towards B
10.0.5.0/24 Serial link towards E
10.0.0.0/16 Serial link towards A (Dystatic route, transit address)==>Active route for traffic destined to 10.0.3.0/24
10.0.0.0/12 Serial link towards B (Dystatic route, transit address)

As it is shown in the routing table of router/routing device D after link towards C fails, the router D will send all traffic destined to network C to the interface which is connected to router A which acts as the highest priority transit router and takes care of the traffic from that point.

Figure 4:
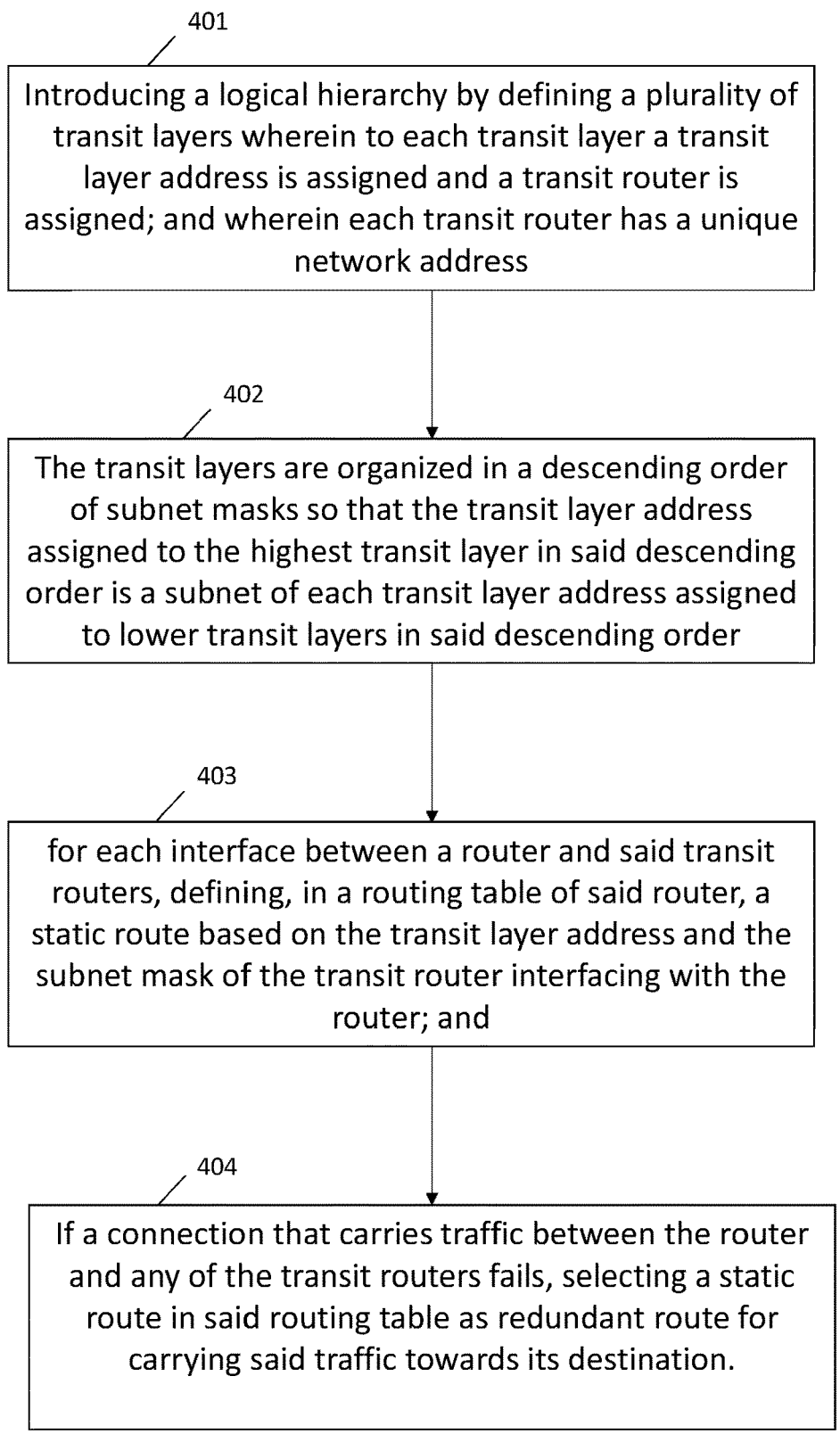
FIG. 4 illustrates a flowchart of a method according to embodiments of the present disclosure.

Referring to FIG. 4, there is illustrated a flowchart of a method according to embodiments of the present disclosure.

As shown the main steps of the (Dystatic) routing method include:

(401) introducing in the network topology a logical hierarchy by defining a plurality of transit layers wherein to each transit layer a transit layer address is assigned, and a transit router is assigned; and wherein each transit router has a unique network address;

(402) the transit layers are organized in a descending order of subnet masks so that the transit layer address assigned to the highest transit layer in said descending order is a subnet of each transit layer address assigned to lower transit layers in said descending order;

(403) for each interface between a router and said transit routers, defining, in a routing table of said router, a static route based on the transit layer address and the subnet mask of the transit router interfacing with the router; and (404) if a connection that carries traffic between the router and any of the transit routers fails, selecting a static route in said routing table as redundant route for carrying said traffic towards its destination.

According to an embodiment, if the connection that carries traffic between the router and any of the transit routers fails, and the transit router is that of a subnet having a lower transit layer address, selecting the static route corresponding to that of the transit router of the highest transit layer as redundant route for carrying said traffic.

According to an embodiment, the transit router associated with the highest transit layer has the highest subnet mask in said descending order, and the transit router associated with the lowest transit layer in said descending order has the lowest subnet mask in said descending order.

According to another embodiment, for each interface between the router/routing device and any of the transit routers, the routing table of the router further includes the transit layer address and the network address of the transit layer associated with the transit router interfacing with said router, and if said connection that carries traffic between the router and any of the transit routers fails, removing, from the routing table of the router the network address and the static route associated with the failed connection.

As stated previously, the Dystatic routing method brings a handful of benefits and advantages compared to other competing routing mechanisms (static routing and dynamic routing). The reason why and how each benefit is achieved is discussed below:

1—Nearly zero impact on CPU/memory utilization of routers

In contrast to dynamic routing which runs extra processes on the router in order to calculate routing algorithms calculations and also send and receive successive routing protocol hello packets or topology database updates, there is no new process added to the router by Dystatic routing so there is obviously no extra CPU load on the router nor any extra bandwidth consumption on the links between routers for sending topology updates or hello packets.

2—Immediate and automatic route changes in case of a link/interface/router failure (route redundancy and failover)

In contrary to dynamic routing, there is no convergence time when it comes to Dystatic routing. Convergence time is the time that the routing protocol needs in order to understand the new topology of the network after any change (like a link failure) and calculates new routes and sends out relevant updates to all involving routers. In Dystatic routing the new (alternative) routes are already in the static routing table and become active as soon as a link failure takes place.

There is no need to wait for any update from neighboring routers or so. There is no need for extra CPU processes for calculations based on huge number of routing tables nor any need for transmitting lots of updates into the network either. We should note that "route removal by failing a link" is a very quick and light process which is "already" a part of the very basic functionality of static routing.

3—Nearly zero downtime/service disruption in case of a link/interface/router failure For the same reason mentioned above.

4—Applicable on devices and equipment with very basic functionality such as in IoT (Internet of Things) or similar.

Since Dystatic routing does not need employing any new process for calculations or running routing protocol updates, etc. any device which has the very basic routing functionality, can participate in a Dystatic routing network too.

5—Increased security because of not sending route information into the network or the link.

Since there is no topology map or list of network addresses sent out to the neighboring routers by Dystatic routing (in contrast to dynamic routing), there is no way for an attacker/eavesdropper who might get access to the link to sniff or intercept the traffic and find out the network topology related data or the addresses of other routers and interfaces in the network.

It should be mentioned that Dystatic routing has some prerequisites (requirements) in order to be able to function and be applied.

1-) Interface Dependent Routes

Routes which are involved in the Dystatic routing process need to be dependent to the corresponding link/interface that they are assigned to. This means that if an interface gets disabled or down, all the corresponding routes towards/through this link or interface must be automatically removed from the routing table. This means that the majority of Wide Area Network (WAN) links and Virtual Private Networks (VPN) connections may be part of the Dystatic routing process, however Ethernet interfaces cannot participate in the Dystatic process because if the remote gateway or interface fails the local interface does not remove the corresponding route to that interface or that gateway (although if the local interface fails or gets shutdown the corresponding routes are removed, but it is not necessary for the Dystatic routing to fully function as asymmetric routes are preferred to be prevented in most designs)

Note: Other routes which are not part of the Dystatic routing process can still be existing regardless of being interface dependent or not.

2-) Flexible IP Address Assignment

In order for the Dystatic routing to function, the IP addresses are supposed to be assigned in a certain way. This means that the IP addresses should be selected and the IP address scheme should be designed based on the Dystatic routing principles. This is, in the majority of cases, not an issue when it comes to assigning IP addresses from the private IP address range according to the RFC 1918 since there are plenty of IP addresses available and the administrator or the designer is in full control to pick whatever IP address she/he wants. However, if for any reason, this is not possible to do, then applying Dystatic could be challenging.

Figure 5:
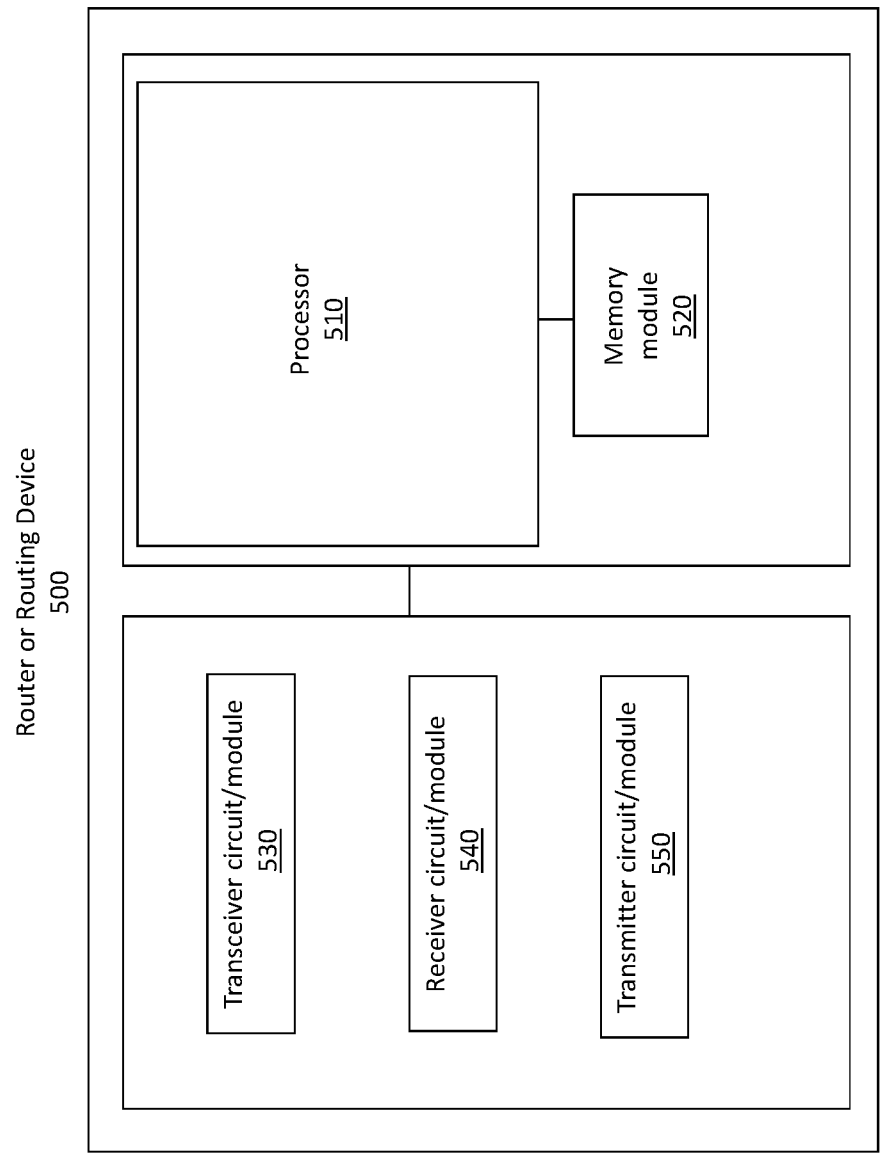
FIG. 5 illustrates a block diagram of a router or routing device according to some embodiments herein.

To perform the Dystatic routing method described herein, a router or a routing device routing device 500 is provided as depicted in FIG. 5. The router 500 comprises a processing circuit or a processing module or a processor 510; a memory module 520; a receiver circuit or receiver module 540; a transmitter circuit or transmitted module 550; and a transceiver circuit or transceiver module 530 which may include the transmitter circuit 550 and the receiver circuit 540. The router 500 may be a wireless router or fix router that can be connected through cables to hosts and to other network devices. The router 500 may support any radio access technology including 2G, 3G, 4G, 5G, Wifi, Wimax or a combination thereof.

The processing module/circuit 510 includes a processor, microprocessor, an application specific integrated circuit (ASIC), field programmable gate array (FPGA), or the like, and may be referred to as the "processor 510." The processor 510 controls the operation of the router 500 and its components. Memory (circuit or module) 520 includes a random access memory (RAM), a read only memory (ROM), and/or another type of memory to store data and instructions that may be used by processor 510. In general, it will be understood that the router 500 in one or more embodiments includes fixed or programmed circuitry that is configured to carry out the operations in any of the embodiments disclosed herein.

The processor 510 configured to execute computer program instructions from a computer program stored in a non-transitory computer-readable medium that is in, or is accessible to the processing circuitry. Here, "non-transitory" does not necessarily mean permanent or unchanging storage, and may include storage in working or volatile memory, but the term does connote storage of at least some persistence. The execution of the program instructions stored in the memory specially adapts or configures the processor 510 to carry out the operations of the router 500 disclosed herein. Further, it will be appreciated that the router 500 may comprise additional components not shown in FIG. 5.

The router or routing device 500 is implementable in a network topology wherein a logical hierarchy is introduced by defining a plurality of transit layers wherein to each transit layer a transit layer address is assigned and a transit router is assigned; and wherein each transit router has a unique network address. The transit layers being organized in a descending order of subnet masks so that the transit layer address assigned to the highest transit layer in said descending order is a subnet of each transit layer address assigned to lower transit layers in said descending order. The routing device 500 is operative to: for each interface between the routing device and said transit routers, define, in a routing table of said router, a static route based on the transit layer address and the subnet mask of the transit router interfacing with the routing device; and if a connection that carries traffic between the routing device and any of the transit routers fails, select a static route in said routing table as redundant route for carrying said traffic towards its destination.

If the connection that carries traffic between the router 500 and any of the transit routers fails, and the transit router is that of a subnet having a lower transit layer address, the router device 500 is configured to select the static route corresponding to that of the transit router of the highest transit layer as redundant route for carrying said traffic.

As previously described, the transit router associated with the highest transit layer has the highest subnet mask in said descending order, and the transit router associated with the lowest transit layer in said descending order has the lowest subnet mask in said descending order.

Further, for each interface between the router and any of the transit routers, the routing table of the router 500 further includes the transit layer address and the network address of the transit layer associated with the transit router interfacing with said router 500.

Further, if said connection that carries traffic between the router 500 and any of the transit routers fails, the router is operative to remove, from the routing table of the router 500 the network address and the static route associated with the failed connection. Additional details and examples have already been described and need not be repeated.

There is also provided a computer program comprising instructions which when executed on at least one processor 510 of the router 500 according to embodiments herein, cause the at least one processor 510 to carry out the Dystatic routing method previously described. Also, a carrier containing the computer program is provided, wherein the carrier is one of a computer readable storage medium; an electronic signal, optical signal or a radio signal.

Throughout this disclosure, the word "comprise" or "comprising" has been used in a non-limiting sense, i.e., meaning "consist at least of". Although specific terms may be employed herein, they are used in a generic and descriptive sense only and not for purposes of limitation. In particular, the embodiments herein may be applicable is any wired or wireless systems, including 2G, 3G, 4G, 5G, Wifi, WiMax etc.

The invention claimed is:

1. A routing method in a network topology, the network topology including routers in communication with transit routers, the method comprising:
   providing, within the network topology, a logical hierarchy, the logical hierarchy defining a plurality of transit layers wherein to each transit layer a transit layer address is assigned and a transit router is assigned, each transit router having a unique network address;
   organizing the transit layers in a descending order of subnet mask prefixes so that the transit layer address assigned to a highest transit layer in said descending order is a subnet of each transit layer address assigned to lower transit layers in said descending order;
   for each interface between a router and said transit router, defining, in a routing table of said router, a static route based on the transit layer address and a subnet mask prefix of the transit router interfacing with the router; and
   if a connection that carries traffic between the router and any said transit router fails, selecting a static route in said routing table as a redundant route for carrying said traffic towards a destination.

2. The method according to claim 1, wherein, if the connection that carries traffic between the router and any said transit router fails, and the transit router is that of a subnet having a lower transit layer address, further comprising selecting the static route corresponding to that of the transit router of the highest transit layer as a redundant route for carrying said traffic.

3. The method according to claim 2, wherein the transit router associated with the highest transit layer has a highest subnet mask prefix in said descending order, and the transit router associated with a lowest transit layer in said descending order has the lowest subnet mask prefix in said descending order.

4. The method according to claim 1, wherein, for each interface between the router and any said transit router, the routing table of the router further includes the transit layer address and the network address of the transit layer associated with the transit router interfacing with said router.

5. The method according to claim 4, wherein if said connection that carries traffic between the router and any said transit router fails, further comprising removing, from the routing table of the router, the network address and the static route associated with the failed connection.

6. A routing device comprising a processor and a memory, said memory containing instructions executable by said processor, the routing device within in a network topology, the network topology including routers in communication with transit routers, and a logical hierarchy, wherein a logical hierarchy defines a plurality of transit layers wherein to each transit layer a transit layer address is assigned and a transit router is assigned, and wherein each transit router has a unique network address, the transit layers are organized in a descending order of subnet mask prefixes so that the transit layer address assigned to the highest transit layer in said descending order is a subnet of each transit layer address assigned to lower transit layers in said descending order; said routing device is operative to:
   for each interface between the routing device and said transit router, define, in a routing table of said transit router or routing device, a static route based on the transit layer address and a subnet mask prefix of the transit router interfacing with the routing device;
   if a connection that carries traffic between the transit router or routing device and any other said transit router fails, select a static route in said routing table as a redundant route for carrying said traffic towards a destination.

7. The routing device according to claim 6, wherein, if the connection that carries traffic between the transit router or routing device and any other said transit router fails, and the transit router is that of a subnet having a lower transit layer address, the routing device is further operative to select the static route corresponding to that of the transit router of the highest transit layer as a redundant route for carrying said traffic.

8. The routing device according to claim 7, wherein the transit router associated with a highest transit layer has the highest subnet mask prefix in said descending order, and the transit router associated with a lowest transit layer in said descending order has the lowest subnet mask prefix in said descending order.

9. The routing device according to claim 6, wherein, for each interface between the transit router and any other said transit router, the routing table of the transit router or routing device further includes the transit layer address and the network address of the transit layer associated with the transit router interfacing with said routing device.

10. The routing device according to claim 9, wherein, if said connection that carries traffic between the routing device or said transit router and any other said transit router fails, the routing device is further operative to remove from the routing table of the router or routing device the network address and the static route associated with the failed connection.

* * * * *